United States Patent
Chen et al.

(10) Patent No.: US 12,057,701 B2
(45) Date of Patent: Aug. 6, 2024

(54) METHOD FOR MGP NEW ENERGY GRID-CONNECTED CONTROL

(71) Applicant: Guizhou Power Grid Company Limited, Guiyang (CN)

(72) Inventors: Julong Chen, Guiyang (CN); Haisen Zhao, Guiyang (CN); Zhenming Liu, Guiyang (CN); Bin Sun, Guiyang (CN); Yi Xue, Guiyang (CN); Qingsheng Li, Guiyang (CN); Yu Zhang, Guiyang (CN); Xueyong Tang, Guiyang (CN); Qingming Zhao, Guiyang (CN); Pu Deng, Guiyang (CN)

(73) Assignee: Guizhou Power Grid Company Limited, Guiyang (CN)

( * ) Notice: Subject to any disclaimer, the term of this patent is extended or adjusted under 35 U.S.C. 154(b) by 224 days.

(21) Appl. No.: 17/265,818

(22) PCT Filed: Jul. 10, 2020

(86) PCT No.: PCT/CN2020/101259
§ 371 (c)(1),
(2) Date: Apr. 2, 2022

(87) PCT Pub. No.: WO2021/169144
PCT Pub. Date: Sep. 2, 2021

(65) Prior Publication Data
US 2022/0247183 A1    Aug. 4, 2022

(30) Foreign Application Priority Data
Feb. 29, 2020 (CN) .......................... 202010132449.9

(51) Int. Cl.
*H02J 3/38* (2006.01)
*H02J 3/42* (2006.01)
(Continued)

(52) U.S. Cl.
CPC ............... *H02J 3/381* (2013.01); *H02J 3/42* (2013.01); *H02J 3/46* (2013.01); *H02P 9/105* (2013.01);
(Continued)

(58) Field of Classification Search
CPC ...... H02J 3/381; H02J 3/42; H02J 3/46; H02J 2300/24; H02J 2300/28; H02P 9/105;
(Continued)

(56) References Cited

U.S. PATENT DOCUMENTS

2021/0028715 A1* 1/2021 Andersen ........... G01R 19/0092
2022/0244750 A1* 8/2022 Chen ........................ H02J 3/44

FOREIGN PATENT DOCUMENTS

CN   105244911 A  *  1/2016
CN   105958543 A  *  9/2016   ............. G01R 31/00
(Continued)

*Primary Examiner* — Patrick O Neill
(74) *Attorney, Agent, or Firm* — IDEA Intellectual Limited; Margaret A. Burke; Sam T. Yip

(57) ABSTRACT

The invention discloses a method for MGP new energy grid-connected control, wherein, the synchronous motor is connected to a synchronous generator; the new energy module drives the synchronous motor to rotate through a frequency converter; the frequency converter controls the power transmission; and the synchronous motor drives the synchronous generator for grid connection. The present invention has the beneficial effects that: the control method and system provided by the invention can improve the stability and reliability of the grid.

10 Claims, 3 Drawing Sheets

(51) Int. Cl.
  *H02J 3/46*    (2006.01)
  *H02P 9/10*    (2006.01)
  *H02P 11/06*   (2006.01)
  *H02P 101/15*  (2016.01)
  *H02P 103/20*  (2016.01)

(52) U.S. Cl.
  CPC ........... *H02P 11/06* (2013.01); *H02J 2300/24* (2020.01); *H02J 2300/28* (2020.01); *H02P 2101/15* (2015.01); *H02P 2103/20* (2015.01); *Y02E 10/56* (2013.01)

(58) Field of Classification Search
  CPC .. H02P 11/06; H02P 2101/15; H02P 2103/20; Y02E 10/56
  See application file for complete search history.

(56) References Cited

FOREIGN PATENT DOCUMENTS

| | | | | | |
|---|---|---|---|---|---|
| CN | 108414831 | A | * | 8/2018 | ............. G01R 23/16 |
| CN | 110504711 | A | * | 11/2019 | ................ H02J 3/40 |
| CN | 113328446 | A | * | 8/2021 | ................ H02J 3/24 |

* cited by examiner

METHOD FOR MGP NEW ENERGY GRID-CONNECTED CONTROL

FIELD OF THE INVENTION

The invention relates to a technical field of grid control, in particular to a method and a system for motor-generator pair (M GP) new energy grid-connected control.

BACKGROUND OF THE INVENTION

In recent years, new energy power generation has been developing continuously and received much attention. The characteristics of new energy generation are very different from those of traditional thermal power unit. The biggest difference is that the output power of new energy is fluctuant and uncontrollable. The traditional thermal power unit can be regarded as a power source that uses chemical energy to store energy and can adjust and control output power at any time, however, the new energy often needs the support of the power grid and delivers power to the grid randomly. Such characteristics make it necessary to predict the output power of new energy when motor-generator pair (M GP) is connected to the grid based on power feedback control. On the one hand, the process of prediction will cause the output delay of the control system, on the other hand, if the prediction is not accurate, the stability and reliability of the control system will be affected. Therefore, an improved control method suitable for MGP is necessary to propose, to follow the power fluctuation of new energy according to the power output characteristics of new energy, the DC voltage fluctuation characteristics of grid-connected inverter, and the operation control characteristics and power angle characteristics of MGP. Such characteristics make it necessary to predict the output power of new energy when MGP is connected to the grid based on power feedback control. On the one hand, the process of prediction will cause the output delay of the control system, on the other hand, if the prediction is not accurate, the stability and reliability of the control system will be affected. Therefore, an improved control method suitable for M GP is necessary to propose, to follow the power fluctuation of new energy according to the power output characteristics of new energy, the DC voltage fluctuation characteristics of grid-connected inverter, and the operation control characteristics and power angle characteristics of MGP.

SUMMARY OF THE INVENTION

The purpose of the section is to outline some aspects of embodiments of the present invention and to briefly introduce some of the optimal embodiments. Some simplifications or omissions may be made in the section and in the abstract of the Claims, and the name of the invention to avoid ambiguity as to the purpose of the section, the abstract of the Claims and the name of the invention, and such simplification or omission shall not be used to limit the scope of the present invention.

The present invention is proposed in view of the above possible problems.

Therefore, the present invention is to solve the technical problem that a method for motor-generator pair (M GP) new energy grid-connected control is proposed, which can control the voltage and improve the stability of the grid.

The present invention has the beneficial effects that the control method and system provided by the invention can improve the stability and reliability of the grid.

DETAILED DESCRIPTION

Embodiment 1

Figure 1:
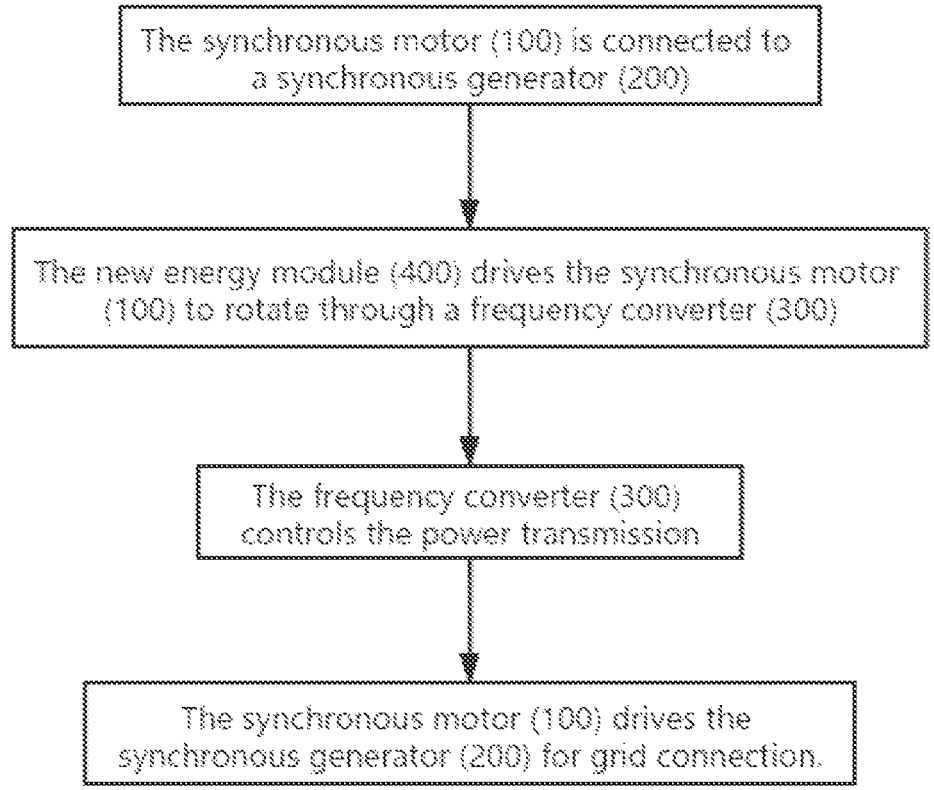
FIG. 1 depicts the whole process of the MGP new energy grid-connected control method described in the first embodiment of the invention.

The FIG. 1 depicts the whole process of the motor-generator pair (M GP) new energy grid-connected control method described in the embodiment of the invention, specifically including the following steps, S1: the synchronous motor (100) is connected to a synchronous generator (200); S2: the new energy module (400) drives the synchronous motor (100) to rotate through the frequency converter (300).

Wherein, the frequency converter (300) also comprises the rectifier (301) and the inverter (302), and the DC capacitor (303) is arranged between the rectifier (301) and the inverter (302).

The new energy module (400) comprises P-V panels or wind turbines. When the new energy module (400) is connected to the grid through MGP, the whole grid-connected system consists of P-V panels or wind turbines, inverters, MGP and other units, and each unit has own operational characteristics. Therefore, the transmission control comprises the fusion of the operating characteristics of each serial module and the combination of their respective characteristics, and finally integration of the operating characteristics of each module for control.

S3: the frequency converter (300) controls the power transmission; in the embodiment, based on the DC voltage fluctuation characteristics of the new energy grid-connected inverter (302) and the charging and discharging rule of the DC capacitor, the control method of P-V panel+MGP and wind turbine+MGP are proposed.

S4: the synchronous motor (100) drives the synchronous generator (200) for grid connection. The method is called MGP grid-connected control.

The inverter (302) is connected with new energy module (400) and the synchronous motor (100). The P-V panel outputs a direct current which is connected to the grid by a direct/alternating transformation through the inverter (302); the wind turbine adopts a full-power converter, and the synchronous generator (200) outputs through the transformation of AC-DC-AC for grid connection. The inverter (302) can control power transmission. The reference value of power transmission needs to match the power output of the new energy.

Wherein, when the new energy module (400) is the P-V panel, a P-V characteristic curve can be obtained through illumination intensity and ambient temperature, and the maximum power point tracing control or constant power control is carried out according to different working occasions.

When the new energy module (400) is the wind turbine, according to the wind turbine speed, pitch angle and other data, combined with the historical power output data, the power output reference of the inverter is calculated.

When the inverter (302) controls the output power to increase, if the power sent by the new energy module (400) is insufficient, then the charging current of the DC capacitor (303) is less than the discharge current, and the capacitor voltage decreases; when the inverter (302) controls the output power to decrease, if the power sent by the new energy module (400) is excessive, then the charging current of the DC capacitor (303) is greater than the discharging current, and the capacitor voltage increases; if the power sent by the new energy module (400) matches the power transmitted by the inverter (302), the voltage of the DC capacitor (303) remains stable.

Figure 2:
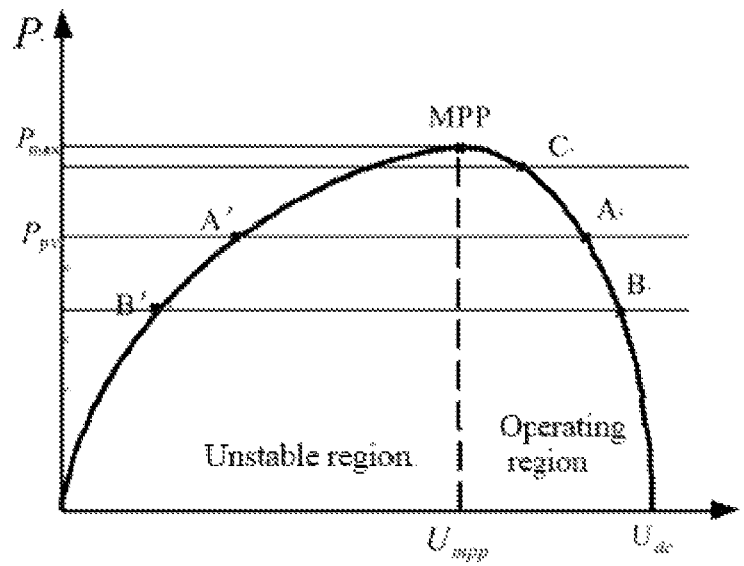
FIG. 2 depicts the P-V operating characteristics of the P-V panel described in the invention.

Specifically, the P-V operating characteristics of P-V panels are shown in FIG. 2, which comprises stable operating region and unstable operating region. In the unstable operating region, the output power of P-V panels increases with the increase of DC voltage, which monotonically increases; and in the stable operating region, the output power of P-V panels decreases with the increase of DC voltage, which monotonically decreases. Normally, P-V panels are required to operate in a stable operating region, otherwise errors of judgment may occur in control, to result in a collapse.

Because the P-V panel needs to be connected to the frequency converter (300) (including the DC capacitor 303), if the voltage on the DC side of control changes, the output power of P-V panels will change; on the contrary, if the P-V power curve changes because of the change of illumination intensity or temperature, the output power of the P-V panel will also change under the condition of constant DC voltage. In the process of changing illumination, it is usually necessary to make P-V panels run at the maximum power point, i.e., the point MPP in FIG. 2, for maximum power point tracing; the output power of P-V panels can also be flexibly controlled by controlling the DC side voltage.

In the embodiment, the P-V panel is connected to the grid through the inverter (302). Under the condition of constant external illumination intensity and temperature (i.e., constant P-V characteristic curve), assuming that the initial operating point of the P-V power supply is A in the stable operating region, the inverter (302) is required to cooperate with the DC voltage change when the P-V power supply power changes. If the P-V panel output power needs to be increased, the reference output power of inverter (302) can be controlled to increase, the discharge current of DC capacitor (303) will increase, and the voltage of DC capacitor (303) will drop, then the P-V operating point will transition from Point A to Point B; if the P-V panel output power needs to be decreased, the reference output power of inverter (302) can be controlled to decrease, the discharge current of DC capacitor (303) will decrease, and the voltage of DC capacitor (303) will increase, the P-V operating point will transition from Point A to Point C. However, in the unstable operating region, assuming that the P-V power supply works at Point A', if the demand for P-V power output increases, the output power of inverter (302) increases, the DC capacitor (303) discharges outward, the DC voltage decreases and goes to Point B', the output goes down instead, and causes the DC voltage to drop until the voltage collapses. Therefore, it is of vital importance to maintain the DC voltage in the stable operating region and ensure the effective control of the DC voltage during the P-V panel operation.

Figure 3:
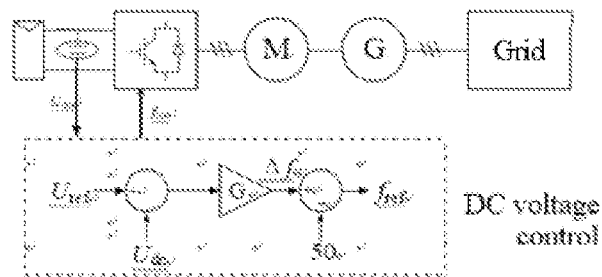
FIG. 3 depicts a schematic diagram of a way to realize DC voltage control of the inverter in the invention.

According to the above analysis, the operating characteristics of P-V panels are as follows: the voltage-power relationship is inversely proportional in the stable operating region. The capacitance characteristic of inverter 302 DC side is that the capacitor voltage is related to the charging and discharging speed; the discharge current is greater than the charging current at a certain moment (i.e., when the inverter (302) output power is greater than the DC input power), the capacitor voltage decreases; otherwise, the capacitor voltage increases. The operating characteristics are: active regulation of inverter (302) output voltage frequency can change the source network phase difference, and then adjust the inverter (302) output power. Comprehensively considering the operating characteristics of each unit of the grid-connected system, the output power can be controlled through frequency modulation, and the DC side voltage can be adjusted, then the mode of P-V output power can be adjusted, so as to achieve the effect of MGP tracking P-V output power. As shown in FIG. 3, for the DC voltage feedback control method, the primary output of P-V power generation is DC, when the source power changes, the DC voltage tends to increase or decrease. The frequency converter (300) DC voltage is stabilized as the control goal to change the phase difference of the source network, and to follow the power change at the source end, the method used is similar to the power feedback; the frequency converter (300) output frequency is adjusted to indirectly adjust the phase difference, and then control the power, finally, MGP can follow the power change of P-V output.

Figure 4:
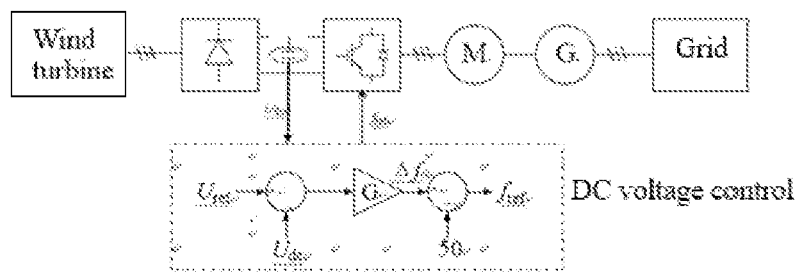
FIG. 4 depicts a schematic diagram of an MGP control method of a direct-driven wind turbine based on voltage feedback in the invention.
Figure 5:
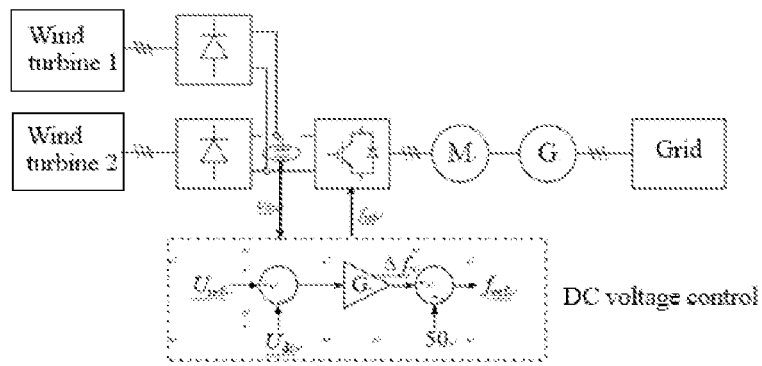
FIG. 5 depicts a schematic diagram of the realization mode of the multi-wind-turbine voltage feedback control strategy of the invention.

When the new energy module (400) is the wind turbine, a control strategy based on voltage feedback control is proposed in the embodiment, the direct-driven wind turbine is connected to the grid through AC-DC-AC frequency converter (including the direct current component), therefore, the embodiment is mainly aimed at direct-driven wind turbines. As shown in FIG. 4, the wind turbine output charges the DC capacitor through uncontrolled rectifier; the control system collects the DC capacitor voltage and takes the DC voltage as the control target, to control the inverter output voltage frequency; the phase difference of MGP source network is adjusted by frequency modulation, to control the power output of MGP system, finally, the transmission power of MGP system can follow the wind turbine output power. In FIG. 4 and FIG. 5, M refers to the synchronous motor (100), and G refers to the synchronous generator (200).

When the new energy module (400) comprises more than one wind turbines, according to the above conclusions, direct-driven wind turbines can converge from the DC side and then drive MGP through the feedback voltage, and a MGP can be used to grid multiple wind turbines in the wind farm. The number of inverters in the wind farm can be reduced if the wind turbine is connected to the grid in the above way; a single inverter is used to replace multiple inverters to increase the reliability of the system. Therefore, as shown in FIG. 5, the rectifiers on the DC side of several wind turbines are connected in parallel, and the MGP is finally driven by an inverter, the control mode is still DC side voltage feedback.

Scenario 1:

To verify the effectiveness of the control strategy, in the embodiment, the control method provided above is used for verification based on simulation, the composition of the simulation system is shown in FIG. 4; the new energy module (400) is a wind turbine, and the output power of the simulated wind turbine is controllable, and the power is transmitted to the DC capacitor through an uncontrolled rectifier; and then the frequency converter (300) drives the synchronous motor (100), and the synchronous motor (100) drives the synchronous generator (200) for grid connection. Simulation and motor parameters are shown in Tables 1 and 2 below.

TABLE 1

Simulation parameters

| Parameter/unit | Value |
| --- | --- |
| AC system voltage/V | 380 |
| Simulated wind turbine maximum power/kW | 5 |
| Synchronous generator capacity/kVA | 5 |
| Synchronous motor capacity/kVA | 5 |
| Power frequency/Hz | 50 |
| Lg/Ω | 0.005 |

TABLE 2

Motor parameters

| Parameter | Value | Parameter | Value |
| --- | --- | --- | --- |
| $r_s$ | 0.003 | rf | 0.0003 |
| Xsl | 0.12 | Xfl | 0.052 |
| Xd | 1.66 | Ldl | 0.138 |
| Xq | 1.71 | Lql | 0.07 |

Figure 6:
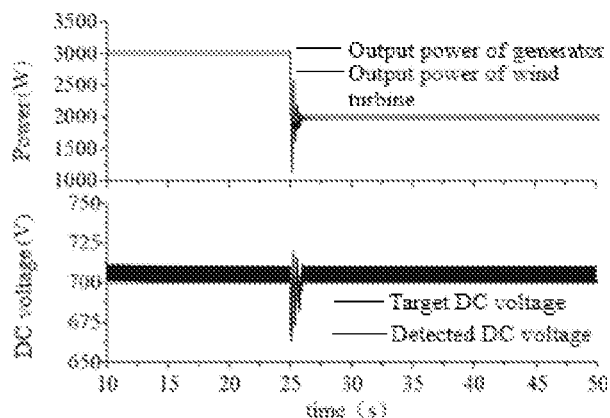
FIG. 6 depicts a schematic diagram of simulation results based on the control method mentioned in the invention.

The simulation process lasts 50 s; in the initial stage of simulation, the output power of the simulated wind turbine is provided as 3000 W; when the simulation runs to 25 s, adjust the output of the simulated wind turbine to 2000 W, and measure the output and DC side voltage of synchronous generator (200). The simulation results are shown in FIG. 6. As shown in FIG. 6, after the simulation starts, the MGP system can run stably and follow the output power of the wind turbine; when the simulation reaches 25 s, the wind turbine output suddenly decreases, the wind turbine output drops, and MGP generator output power also drops, the wind turbine output can continue to be followed. It can be seen from analysis of DC side voltage of inverter, after the simulation, the DC side voltage of the inverter can always be maintained near the target voltage, when the output power of wind turbine at 25 s suddenly changes, the DC voltage also changes, by adjusting the control method, the DC voltage can be maintained near the target voltage, which also ensures that the MGP can follow the output power of wind turbine.

Figure 7:
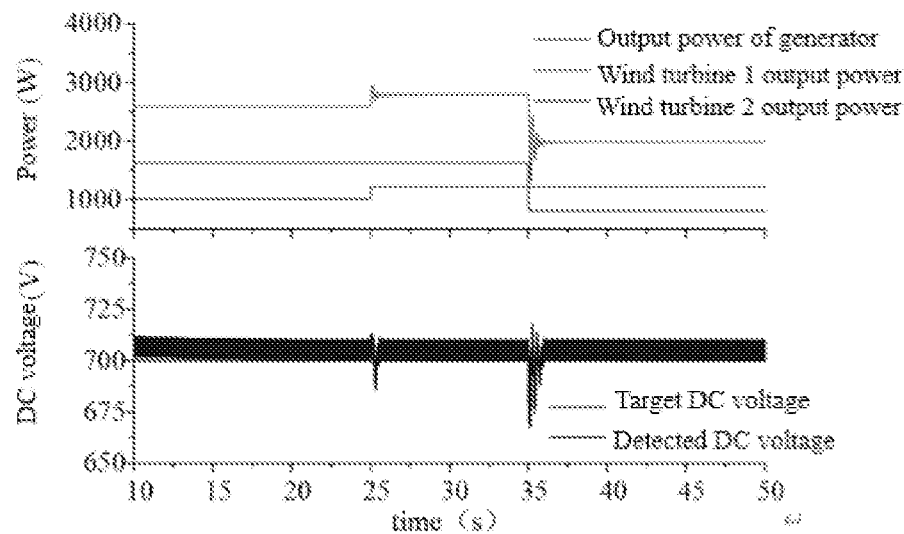
FIG. 7 depicts a schematic diagram of simulation results based on the grid-connected control method of multi-direct-driven wind turbines and MGP.

To further verify the control method proposed in the embodiment, the grid-connected control method of multiple direct-driven wind turbines+MGP is also simulated; as shown in FIG. 6, the simulation process lasts 50 s, in the initial stage of simulation, the output power of the wind turbine 1 is provided as 1600 W, and the output power of wind turbine 2 is 1000 W, when the simulation runs to 25 s, the output of wind turbine 2 is increased to 1200 W, and when the simulation runs to 35 s, the output of wind turbine 2 is decreased to 800 W, then the generator output and DC voltage are measured. The simulation results are shown in FIG. 7. It can be seen that, the output power of the synchronous generator (200) can follow that of the two wind turbines, and the two wind turbines will not affect each other when the power fluctuates. The DC voltage can also effectively follow the reference value. The effectiveness of the control method is verified.

Embodiment 2

Figure 8:
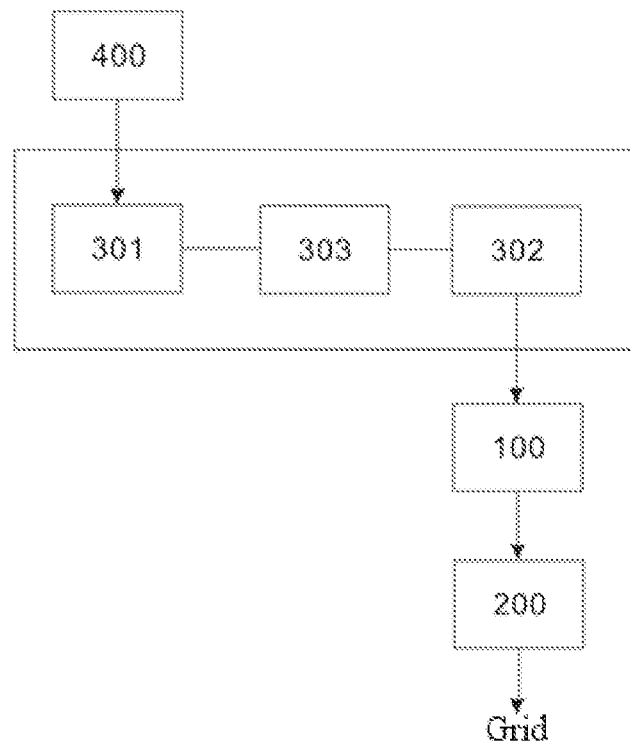
FIG. 8 depicts the overall structure diagram of the MGP new energy grid-connected control system mentioned in the second embodiment of the invention.

The FIG. 8 depicts the overall structure of the MGP new energy grid-connected control method described in the embodiment of the invention, the MGP new energy grid-connected control method can be realized based on the system. The system comprises the synchronous motor (100), the synchronous generator (200), the frequency converter (300) and the new energy module 400.

The synchronous motor (100) can be driven by the new energy module (400) to rotate.

The synchronous generator (200) can be connected to the grid under the drive of the synchronous motor (100); wherein, the synchronous motor (100) and the synchronous generator (200) can be connected by couplings.

The frequency converter (300) also comprises the rectifier (301), the inverter (302) and the DC capacitor (303), which can control the power transmission.

The new energy module (400) can drive the synchronous motor (100) through the frequency converter (300).

It should be recognized that, embodiments of the invention may be realized or implemented by computer hardware, a combination of hardware and software, or by computer instructions stored in non-transient computer-readable memory. The method can be implemented in a computer program using standard programming techniques (including a non-transient computer-readable storage medium configured with computer programs), wherein the storage medium configured in this way enable the computer to operate in specific and predefined ways—according to the method described in specific embodiments and figures. Each program can be implemented in a high-level process or object-oriented programming language to communicate with a computer system. However, the program can be implemented in assembly or machine language as required. In any cases, the language can be compiled or interpreted. In addition, the program can be run on a dedicated integrated circuit programmed for the purpose.

The procedures described herein in any appropriate order can be followed, unless otherwise indicated or otherwise obviously inconsistent with the context. The procedures described herein (or variations and/or combinations thereof) can be executed under the control of one or more computer systems configured with executable instructions, and can be implemented as code (for example, an executable instruction, one or more computer programs, or one or more applications), hardware, or a hardware combination that execute together on one or more processors. The computer program comprises a plurality of instructions that can be executed by one or more processors.

Furthermore, the method can be implemented in any type of computing platform that is operationally connected to the appropriate one, including but not limited to personal computer, minicomputer, master frame, workstation, network or distributed computing environment, separate or integrated computer platform, or communication with charged particle tools or other imaging devices, etc. The invention may be realized by machine-readable codes stored on a non-transient computer-readable storage medium or device, whether the storage medium is mobile or integrated into a computing platform, such as hard disk, optical reading and/or write-in storage medium, RAM and ROM; the storage medium is readable by a programmable computer, when the storage medium or device is read by a computer, it may be used to configure and operate the computer to perform the procedures described herein. In addition, machine-readable code, or parts of it, can be transmitted over wired or wireless networks. When the medium (combined with a microprocessor or other data processor) is used to implement the procedures described above, the invention comprises these and other different types of non-transient computer-readable storage media. The invention also comprises the computer itself when programming according to the method and techniques described in the present invention. A computer program can be applied to the input data to perform the functions described herein, so that the input data is transformed to generate output data stored in non-volatile memory. The output information can also be applied to one or more output devices, such as a display. In the preferred embodiment of the invention, the transformed data represents physical objects, including a specific visual representation of physical objects produced on the display.

What is claimed is:

1. A method for motor-generator pair (MGP) new energy grid-connected control, comprising:
   connecting a synchronous motor (100) to a synchronous generator (200);
   driving the synchronous motor (100) by a new energy module (400) to rotate through a frequency converter (300);
   controlling power transmission between the new energy module (400) and the synchronous motor (100) by the frequency converter (300), wherein the frequency converter (300) comprises a rectifier (301), an inverter (302), and a DC capacitor (303) arranged between the rectifier (301) and the inverter (302);
   driving the synchronous generator (200) by the synchronous motor (100) for grid connection, wherein, when the inverter (302) increases its output power and power provided by the new energy module (400) is insufficient, a charging current for the DC capacitor (303) is tuned to be less than a discharge current for the DC capacitor (303), resulting in a decrease in a voltage of the DC capacitor voltage, and wherein, when the inverter reduces its output power and the power provided by the new energy module is excessive, a charging current for the DC capacitor (303) is tuned to be greater than a discharging current for the DC capacitor (303), resulting in an increase in a voltage for the DC capacitor, and wherein if power provided by the new energy module (400) matches power transmitted by the inverter (302), a voltage for the DC capacitor (303) remains stable.

2. The method for MGP new energy grid-connected control according to claim 1, wherein the new energy module (400) comprises a P-V panel or a wind turbine.

3. The method for MGP new energy grid-connected control according to claim 1, wherein the controlling the power transmission comprises fusion of operating characteristics of the new energy module, the frequency converter, the synchronous motor, and the synchronous generator which are connected in series and a combination of their respective characteristics, and finally integration of the operating characteristics of them for control.

4. The method for MGP new energy grid-connected control according to claim 3, wherein the new energy module (400) is a P-V panel or a wind turbine, wherein the P-V panel outputs a direct current which is connected to the grid by a direct/alternating transformation through the inverter (302), and wherein the wind turbine adopts a full-power converter, and the synchronous generator (200) outputs through transformation of AC-DC-AC for grid connection.

5. The method for MGP new energy grid-connected control according to claim 4, wherein, when the new energy module (400) is the P-V panel, a P-V characteristic curve is obtained through illumination intensity and ambient temperature, and wherein maximum power point tracing control or constant power control is carried out according to different working occasions.

6. The method for MGP new energy grid-connected control according to claim 4, wherein, when the new energy module (400) is the wind turbine, according to a wind turbine speed, pitch angle and other data, combined with historical power output data, a power output reference of the inverter is calculated.

7. A system for motor-generator pair (MGP) new energy grid-connected control, comprising:
   a synchronous motor (100) driven by the new energy module (400) to rotate;
   a synchronous generator (200) connected to the grid under the drive of the synchronous motor (100);
   a frequency converter (300) comprising a rectifier (301), an inverter (302) and a DC capacitor (303) arranged between the rectifier (301) and the inverter (302), which are arranged for controlling power transmission;
   a new energy module (400) driving the synchronous motor (100) through the frequency converter (300), wherein, when the inverter (302) increases its output power and power provided by the new energy module (400) is insufficient, a charging current for the DC capacitor (303) is tuned to be less than a discharge current for the DC capacitor (303), resulting in a decrease in a voltage of the DC capacitor voltage, and wherein, when the inverter reduces its output power and the power provided by the new energy module is excessive, a charging current for the DC capacitor (303) is tuned to be greater than a discharging current for the DC capacitor (303), resulting in an increase in a voltage for the DC capacitor, and wherein if power provided by the new energy module (400) matches power transmitted by the inverter (302), a voltage for the DC capacitor (303) remains stable.

8. The system for MGP new energy grid-connected control according to claim 7, wherein the new energy module (400) comprises a P-V panel or a wind turbine.

9. The system for MGP new energy grid-connected control according to claim 8, wherein, when the new energy module (400) is the wind turbine, according to wind turbine speed, pitch angle and other data, combined with historical power output data, a power output reference of the inverter is calculated.

10. The system for MGP new energy grid-connected control according to claim 8, wherein, when the new energy module (400) is the P-V panel, a P-V characteristic curve is obtained through illumination intensity and ambient temperature, and wherein maximum power point tracing control or constant power control is carried out according to different working occasions.

\* \* \* \* \*